United States Patent [19]

Kuang

[11] Patent Number: 5,390,172
[45] Date of Patent: Feb. 14, 1995

[54] ELECTRONIC DISTRIBUTION SYSTEM AND METHOD

[76] Inventor: Gilbert Kuang, P.O. Box 36035, Los Angeles, Calif. 90036

[21] Appl. No.: 945,010

[22] Filed: Sep. 15, 1992

[51] Int. Cl.[6] .......................................... H04Q 11/04
[52] U.S. Cl. ..................... 370/60; 370/94.1; 375/122
[58] Field of Search ............ 375/107, 122; 370/60.1, 370/61.6, 94.1, 94.3, 62, 110.1; 340/825.07; 455/53.1, 49.1

[56] References Cited

U.S. PATENT DOCUMENTS

| | | |
|---|---|---|
| 4,024,345 | 5/1977 | Kochem . |
| 4,124,773 | 11/1978 | Elkins . |
| 4,130,801 | 12/1978 | Prygoff . |
| 4,535,450 | 8/1985 | Tan ..................... 370/85.13 |
| 4,734,764 | 3/1988 | Pocock et al. . |
| 4,789,863 | 12/1988 | Bush . |
| 4,893,340 | 1/1990 | Lubarsky et al. ........... 370/60 |
| 5,045,850 | 9/1991 | Andros et al. ............. 370/61 |
| 5,107,260 | 4/1992 | Meissner et al. ............ 370/61 |

Primary Examiner—Stephen Chin
Assistant Examiner—T. Ghebretinsae
Attorney, Agent, or Firm—Pretty, Schroeder, Brueggemann & Clark

[57] ABSTRACT

An electronic distribution system and method for combining a digital data signal, such as digital broadcast material, with instructions and a destination list for electronic delivery to a distribution center over a communications circuit connectable to a predetermined set of remote destinations. At the distribution center, the destination list is accessed and a copy of the digital data signal and the instructions are forwarded to only those remote destinations on the destination list.

2 Claims, 5 Drawing Sheets

ELECTRONIC DISTRIBUTION SYSTEM AND METHOD

BACKGROUND OF THE INVENTION

1. Field of the Invention

This invention relates to electronic storage and distribution systems, and in particular to digital communication systems wherein a source may transmit data packages, consisting of digitized broadcast materials, instructions and destination lists, to a central distribution center for transmission to at least one remote destination.

2. Description of the Prior Art

Prior art distribution systems have generally fallen into three categories. The first category of system employs a master control center having a plurality of available audio program materials. Similar to electronic mail, the master control center creates a copy of each available material for each remote destination. This type of distribution system requires vast amounts of mass storage to hold multiple copies of large data files. Consequently, this type of system is cost ineffective and accordingly large file transfers have not previously been automated for multi-point destinations.

A second category of distribution systems is described in Elkins U.S. Pat. No. 4,124,773, wherein a master data bank located at a central location is coupled to a plurality of user locations by a common communications circuit, such as telephone lines. By using the system described in that patent, a remotely located user can transmit a command signal over the communications circuit to the master data bank to select a desired program material stored therein. The material is then copied from the data bank and transmitted to the remote user via the communications circuit. The system described in the Elkins patent does not dispose or suggest a process whereby broadcast material is sent by a source, such as an advertising agency, along with instructions and a destination list to a distribution center, which then forwards the material and instructions to the destination or destinations on the destination list. Consequently, when using the Elkins' system, a source cannot specifically direct its broadcast material and instruction to targeted end users.

A third category of electronic distribution systems is a satellite delivery system of the type described in Prygoff U.S. Pat. No. 4,130,801. This category of systems utilizes a microwave transmitting station and receiving station for the transmission of audio material. The audio broadcast material is transferred to a microwave transmitting station via available cable for transmission over microwave channels to a microwave receiving station. From the receiving station the signal is fed to a first earth station and beamed to a satellite. The signal is then sent to one or more receiving earth stations located throughout the United States or other points. Next, the signal is carried between microwave transmitting and receiving stations to local FM broadcasting stations.

Such satellite delivery systems require the end-users to schedule the receipt of the broadcast material and schedule the required labor and equipment, around the schedule of satellite time and capacity. Moreover, satellite delivery systems generally utilize analog equipment that does not provide for digital accuracy. Additionally, while simplex satellite broadcast delivery does not provide for confirmation of delivery, duplex satellite systems are not cost effective. Finally, the system described in the Prygoff patent does not disclose or suggest a system whereby a source can transmit broadcast material to desired remote locations along with instructions for using the material.

It should, therefore, be appreciated that there is a need for an electronic distribution system whereby a source can transmit digital broadcast material and accompanying instructions via a distribution center to one or more remote destinations. The electronic distribution system should provide for the transmission of instructions and a destination list from the source to the distribution center and then provide for the transmission of the instructions and the broadcast material to the remote destinations. Additionally, the electronic distribution system should ideally distribute the broadcast material and instructions as packaged data, such as in a Unix Tar package, using duplex communications. This type of a system would use minimal expendable material while reusing hardware, software and communications circuits for each delivery. The present invention provides an electronic distribution system meeting these needs.

SUMMARY OF THE INVENTION

The present invention relates to an electronic delivery system and method for combining a digital data signal, such as digital broadcast material, with instructions and a remote destination list for electronic delivery to a distribution center. At the distribution center, the destination list is accessed and a copy of the digital data signal and the instructions are forwarded to each remote destination. In alternative embodiments, an analog to digital converter can be added to the system to digitize audio, video and other multi-media material to generate the digital data signal used by the present invention. Further, a digital to analog converter can be utilized by the remote location to convert the digital data signal into an analog message.

Specifically, the present invention includes a combiner that forms a first data package by combining a digital data signal with a set of instructions for use of the data signal and with a destination list including at least one remote destination. The first data package is then transmitted to a distribution center via either leased or switched lines using duplex synchronous communications. At the distribution center, the first data package is received and the destination list is separated from the digital data signal and the instruction set. The present invention then transmits a second data package consisting of the digital data signal and the instruction set simultaneously to each remote destination contained in the destination list. At each remote destination, the second data package is received and disassembled to separate the digital data signal from the set of instructions.

In yet another feature of the invention, the first and second data packages are examined to determine differences between the packages before and after transmission from either the source to the distribution center, or from the distribution center to the remote destination. This feature increases the accuracy of the electronic distribution system of the present invention and insures the integrity of the transmitted broadcast material.

Other aspects and advantages of the present invention will become apparent from the following description of the preferred embodiment, taken in conjunction

DESCRIPTION OF THE PREFERRED EMBODIMENT

Figure 1:
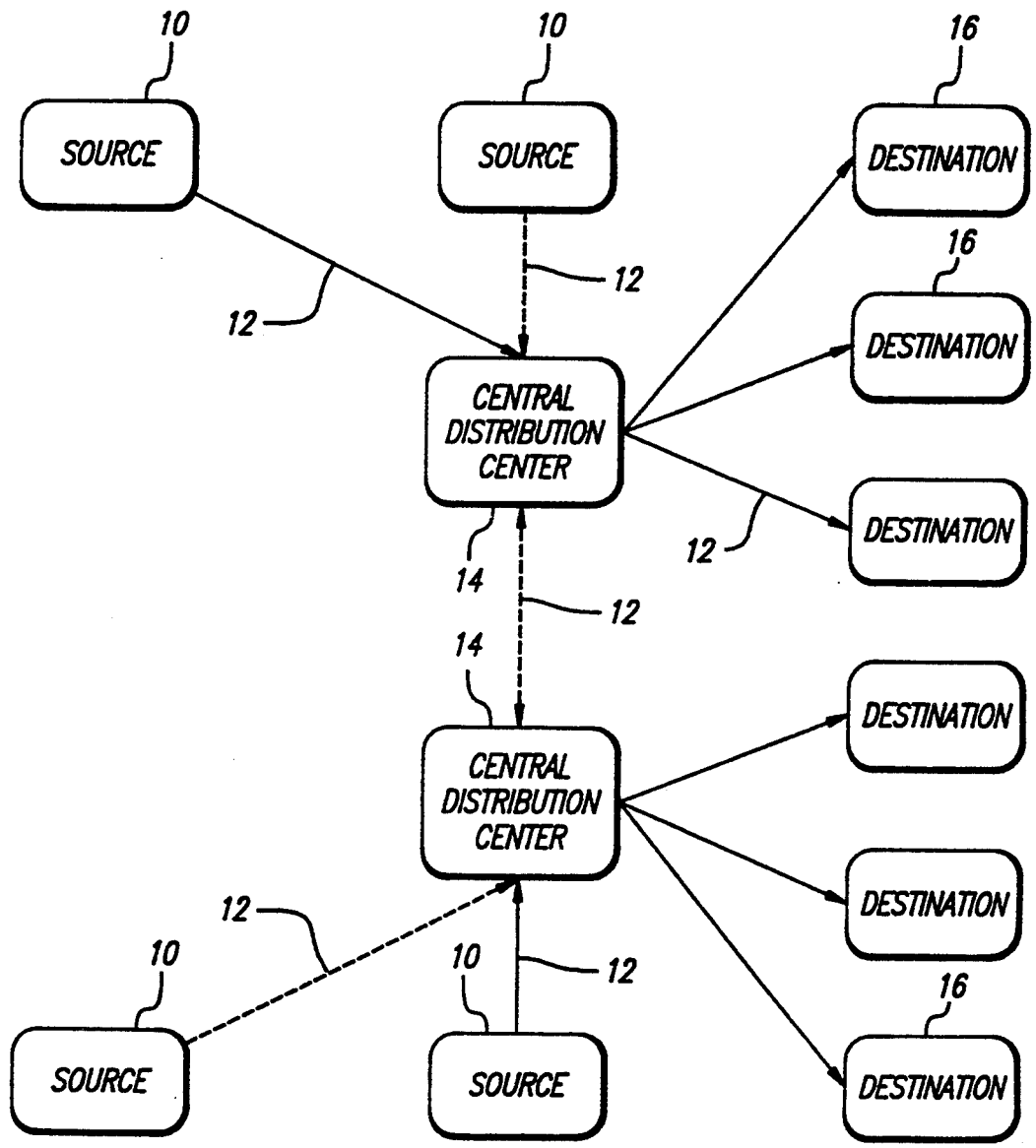
FIG. 1 is a block diagram of an electronic distribution system utilizing the present invention.

With reference now to the illustrative drawings, and particularly to FIG. 1, one or more Sources 10 combine a digital data signal representative of an audio, video or other multi-media material with a set of instructions and a destination list to form a first data package that is transmitted via a communications circuit 12 to a central distribution center 14.

Once the first data package is received by the distribution center 14, the destination list is selectively removed from the first data package. The resulting second data package is then forwarded to either another distribution center 14 and then on to designated remote destinations 16, or directly to remote destinations 16, via the communications circuit 12. Ideally, the transmission of the second data packages to the remote destinations 16 utilizes simultaneous duplex synchronous communications systems to expedite delivery of the data packages and maximize reliability.

Figure 2:
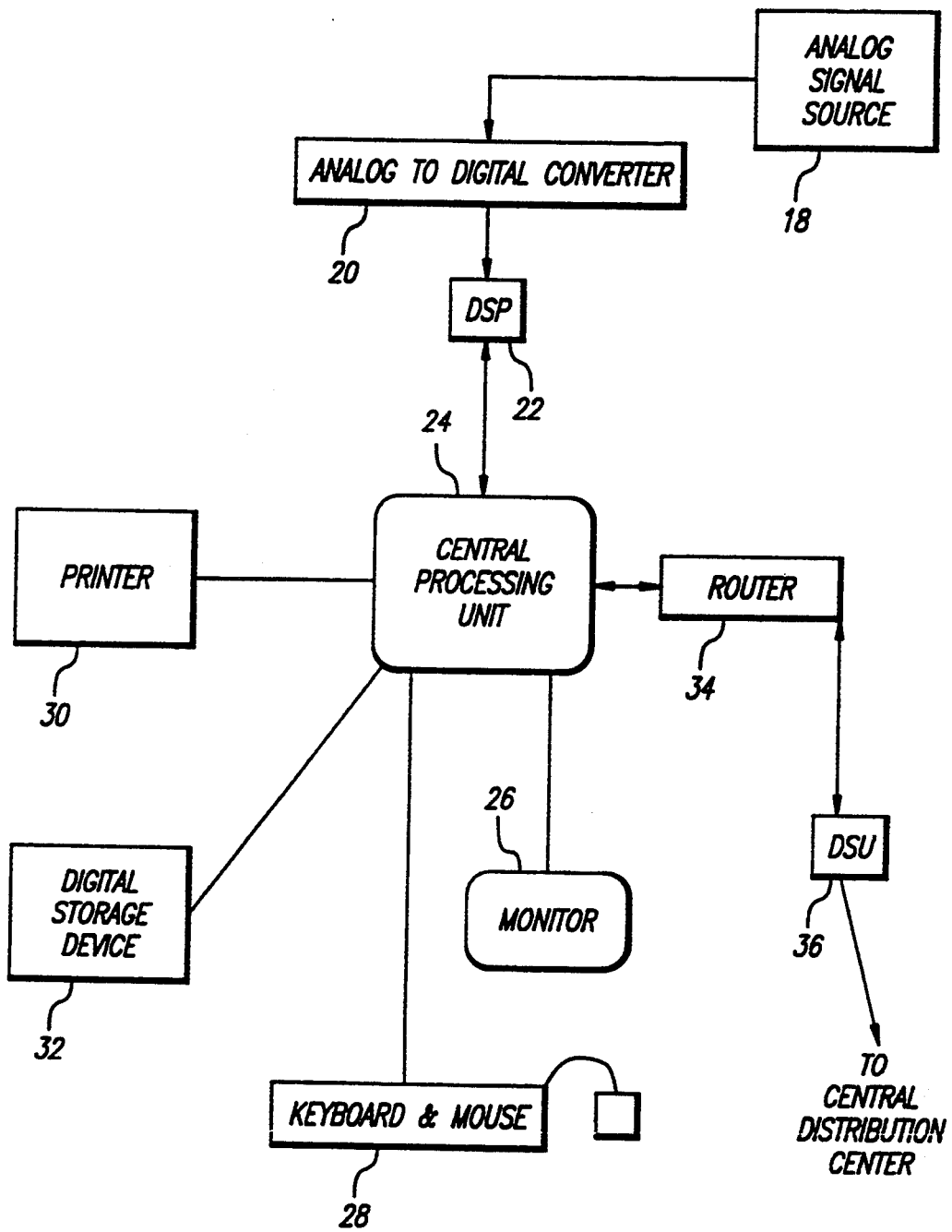
FIG. 2 is a block diagram of the apparatus utilized by a source of broadcast material.

A more detailed embodiment of the present invention is illustrated beginning in FIG. 2. In this embodiment, an analog signal source 18 provides an analog signal to an analog-to-digital converter 20. The analog signal source 18 may be a variety of components such as microphones, tape recorders, disc reproducers, video cameras and other multi-media sources. Analog-to-digital converters are well known in the art and usually operate by generating an internal time base, sampling the analog signal input at some predetermined point in each of the time base segments, and then generating a digital output responsive to the sampled level obtained during the sampling period. The output of the analog-to-digital converter 20 may be either a parallel digital or serial digital.

The digital data signal output by the analog-to-digital converter 20 can be transmitted to an optional first digital signal processor (DSP) 22, which incorporates a high-speed processing chip to measure and process the output of the audio-to-digital converter 20 prior to transmitting the optimized signal to a first central processing unit (CPU) 24. Typically, a DSP formats digitized signals into a form that is optimal for transmission via a communications circuit. Additionally, the DSP 22 may utilize a digital compression algorithm to compress the size of the information transmitted to the first CPU 24.

Prior to transmission of the digital data signal to a distribution center 14, a set of instructions for use of the broadcast material and a destination list must be created. Accordingly, a first monitor 26, a first keyboard and mouse unit 28, and a first printer 30 are connected to the first CPU 24. Using standard word processing techniques, a set of instructions and a destination list can be entered into the first CPU 24.

The digital data signal from the analog to digital converter 20 or from the first DSP 22 is the combined with the instructions and the destination list to form a first data package. In the preferred embodiment, the first data package is in the form of a Tar file, which is particularly well suited for electronic transfers. The printer 30 can be utilized to create a hard copy of the instructions and the destination list and the first data package or its individual components can be stored in a digital storage device 32.

In a detailed embodiment of the present invention, the first CPU 24 not only combines the elements of the first data package, but it also performs an error detection computation prior to transmitting of the first data package to the distribution center 14. In particular, the first CPU 24 performs a Check-Sum operation whereby the first CPU 24 makes a calculation based upon the contents of the first data package. The calculation creates a first error code such as a coded serial number that indicates the size of the elements contained in the first data package. The Check-Sum operation can be performed on a data package at any time during the electronic distribution system of the present invention, and the resulting error code compared to the previously calculated error code to verify the integrity of the data package. However, the Check-Sum operation is typically performed after a transmission, the event that is most likely to inject errors into a data package.

Once the first data package is formed by combining the digital signal, instructions and the destination list, and the first error code is calculated, they are transmitted to the central distribution center 14. In the preferred embodiment, the first CPU 24 transmits the first data package and first error code through a first router 34 to a first data service unit (DSU) 36. Typically, a router selectively transmits only information that is designated to be transmitted to a specified device connected to its output, in this case, the first DSU 36. Alternatively, a bridge can be utilized in place of the router 34. Generally, a bridge does not differentiate between information designated or not designated to be transmitted to the specified device connected to its output. Accordingly, a bridge can be utilized to directly connect the first CPU 24 to the first DSU 36, however, it does not selectively transmit information to the first DSU 36.

The first DSU 36, like most DSUs, converts the information to be transferred into a format that is suitable for use on the chosen communications circuit. A digital modem can be utilized as the first DSU 36 or any DSU to convert the format of the first error code and the first data package into a format that is suitable for the characteristics of the communications circuit 12. Consequently, if the characteristics of the communications circuit 12 require a special digital format or change as technology improves, the first DSU 36 can be modified to upgrade or modify the formatting of the digital data. Following the conversion of the digital data format by the first DSU 36, the newly formatted first data package and first error code are transmitted to the central distribution center 14 via the communications circuit 12.

The communications circuit 12 is generally a two-way link capable of utilizing duplex synchronous communications such as telephone lines, private leased lines, and wide-band coaxially communication systems. In the present invention, the communications circuit 12 is connectable to a predetermined set of remote locations.

In this manner, the connections between the distribution centers and remote destinations are predetermined prior to the transmission of a data package from a Source 10. Further, the remote destinations contained in the destination list are selected from the predetermined set of remote locations. Accordingly, it is the Source 10 that determines the subset of remote destinations that will receive the digital data signal and instructions. Of course, the predetermined set of remote locations can change between transmissions from a source, such that remote destinations can be added or deleted from the predetermined set.

Presently, narrow-band or wide-band telephone lines are the most cost effective method of transmitting digital data from one point to another. However, the rapid growth of technology may change this situation shortly. For example, two-way coaxial lines that are commonly available to homes through cable systems and interactive computer terminal systems include an unused band width that may prove cost effective for digital data transmission. One of the primary advantages of the digital transmission of data is that the quality and quantity of the signal being transmitted may be easily changed to respond to the addition of increased band width or changes in technology.

Figure 3:
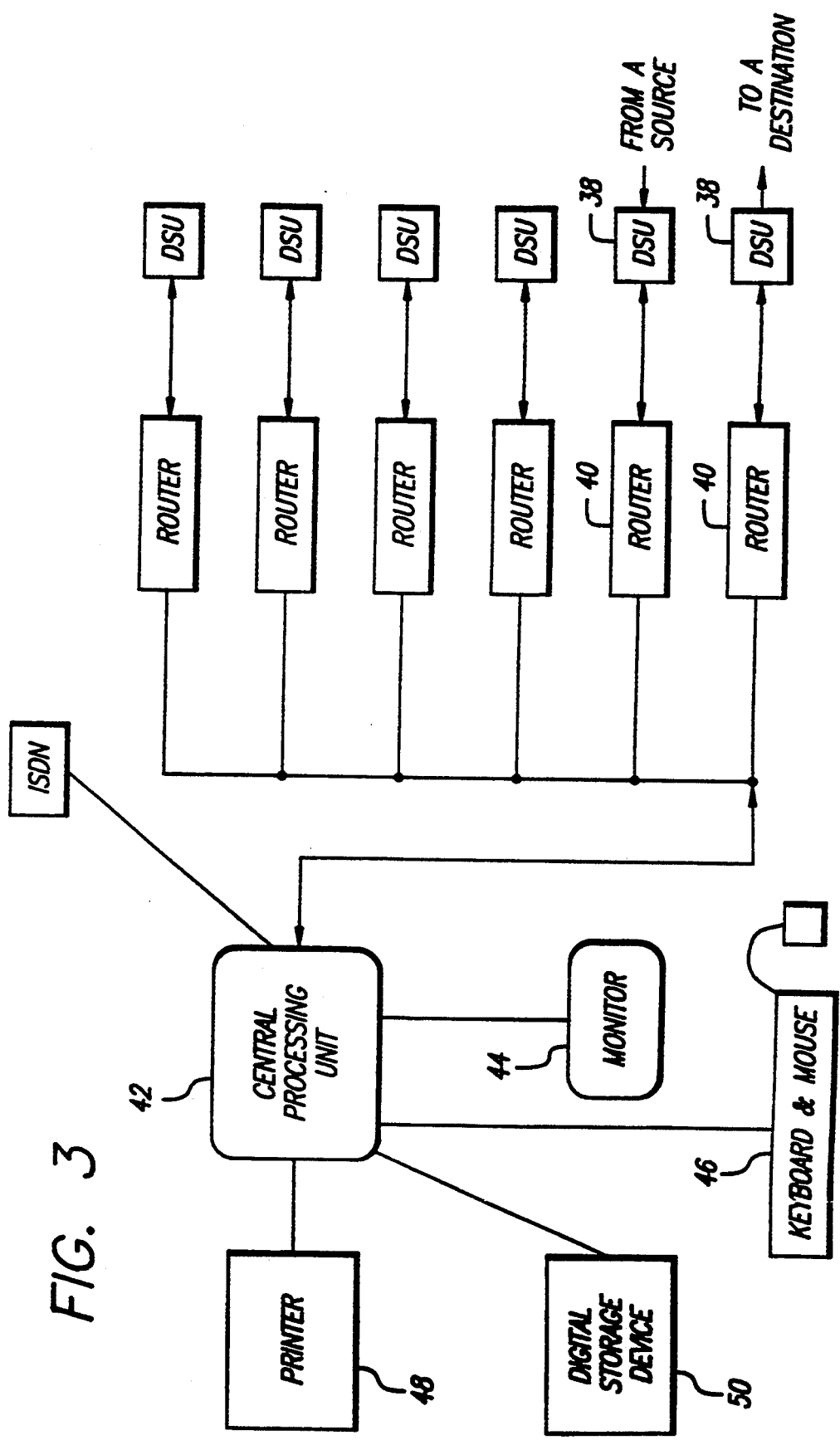
FIG. 3 is a block diagram of the hardware utilized by a central distribution system.

As illustrated in FIG. 3, each distribution center 14 has at least one second DSU 38 that receives the first data package and the first error code. A receiving DSU performs the reverse operation of a transmitting DSU in that it changes the format of the transferred information from a format that is suitable for use on the chosen communications circuit to a format that can be used by a CPU. Once received by the second DSU 38, the first data package and the first error code are transmitted through a second router 40 to a second CPU 42. The second CPU 42 then selects the destination list from the first data package, reads the destination list and removes it from the first data package. A second data package is then formed which includes the digital data file and the instruction set. The second CPU 42 then transmits the second data package to each of the remote destinations on the destination list through the second router 40 and the second data service unit 38 or through a substantially identical second router 40 and second DSU 38.

In the preferred embodiment, the second CPU 42 performs a Check-Sum operation and thereby calculates a second error code by utilizing the error detection calculation described above. The second CPU 42 then compares the first error code and the second error code to determine if any errors occurred during transmission of the first data package from the Source 10 to the distribution center 14. If the first error code and the second error code are identical, then no transmission errors have occurred. However, if they are not identical, then the second CPU 42 at the distribution center 14 will notify the first CPU 24 at the Source 10 to retransmit the first data package and the first error code. In this manner, the integrity of the broadcast material is maintained.

A second monitor 44, a second keyboard and mouse unit 46 and a second printer 48 are also attached to the second CPU 42 to allow a user to control the second CPU 42. A second digital storage device 50 is also connected to the second CPU 42 to permit storage of the second data package.

Figure 4:
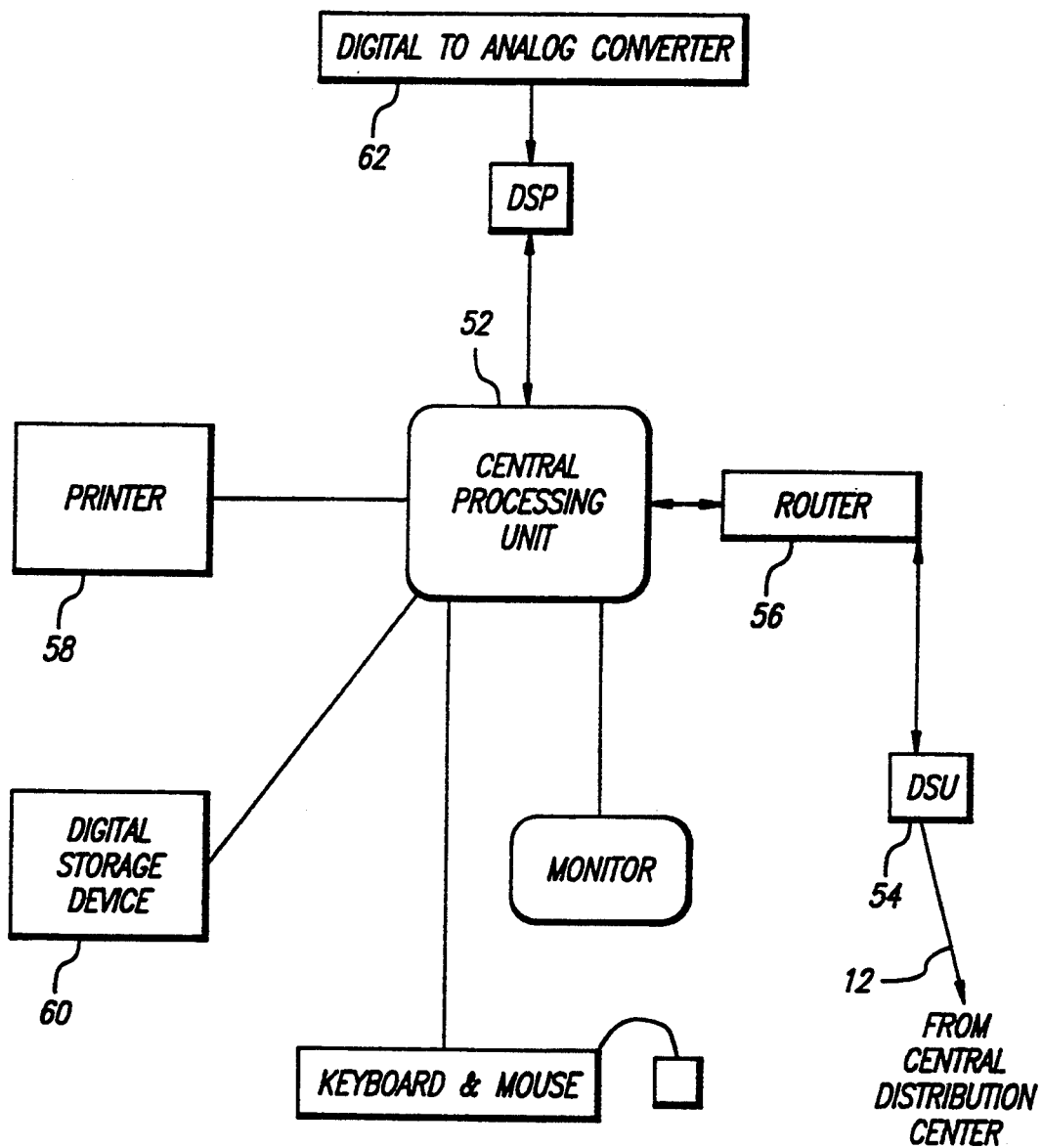
FIG. 4 is a block diagram of the hardware used by a remote destination utilizing the present invention.

After the second data package is generated when the second CPU 42 separates the destination list from the other elements in the first data package, the second CPU 42 performs a Check-Sum operation on the second data package. This Check-Sum operation generates an alpha error code. Next, as illustrated in FIG. 4, the second data package and the alpha error code are transmitted to the remote destination 16 via the communications circuit 12. They are then transferred to a third CPU 52 via a third DSP 54 and a third router 56. The third CPU 52 then performs a Check-Sum operation on the second data package it has received, and generates a beta error code. The third CPU 52 then compares the alpha error code and the beta error code to determine if any errors occurred during transmission of the second data package from the distribution center 14 to the remote destination 16.

Once the integrity of the second data package is verified through the Check-Sum error detection process, the third CPU 52 disassembles the second data package and separates the digital data signal from the instructions. The instructions and the digital data signal can be printed via a third printer 58 that is attached to the third CPU 52 and the they can be stored in a third digital storage device 60 that is also connected to the third CPU 52.

Figure 5:
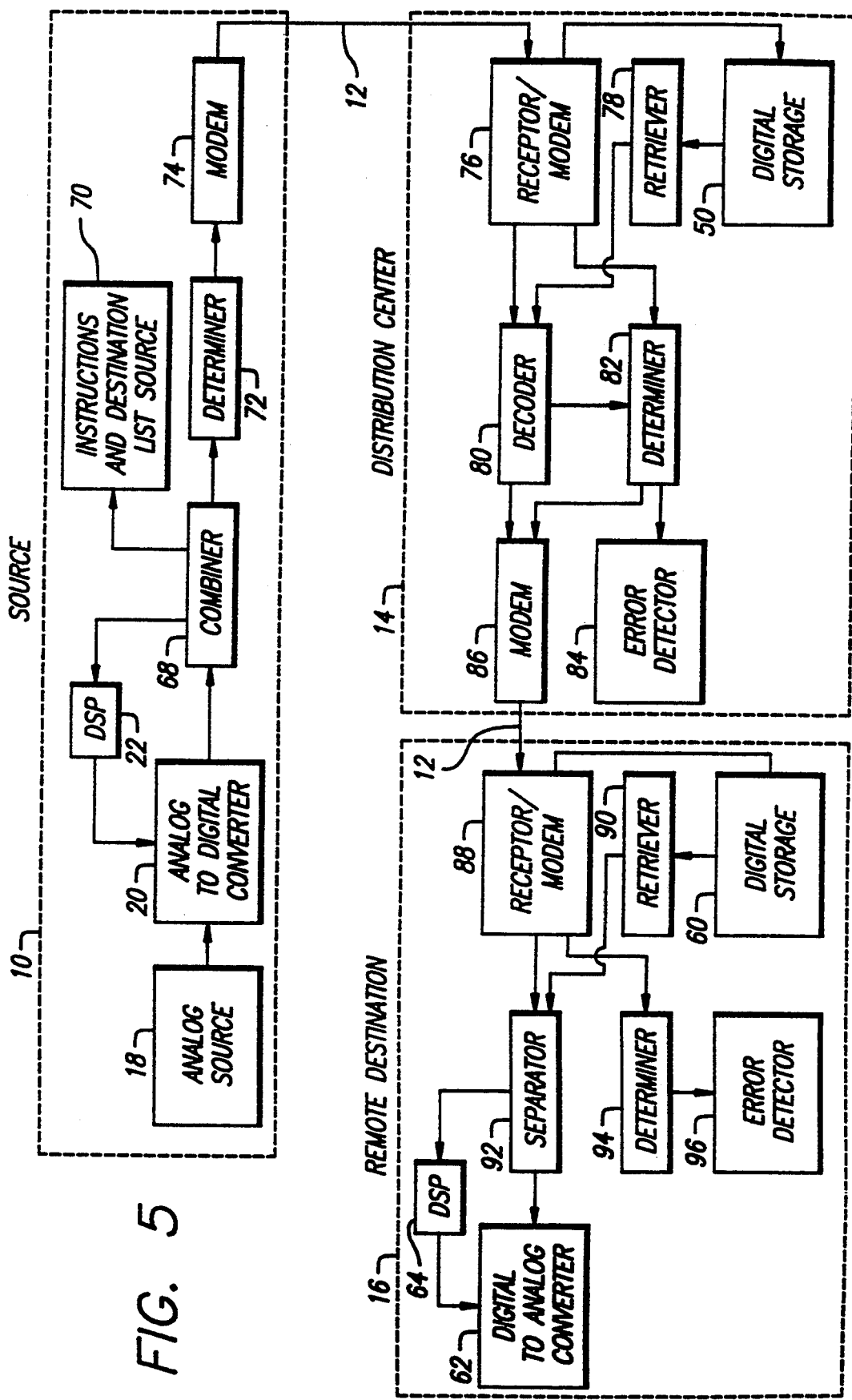
FIG. 5 is a block diagram illustrating the system of the present invention.

The operation of the system and method of the present invention is best illustrated with reference to FIG. 5. First, an analog signal source 18 is converted to a digital data signal by the analog to digital converter 20. To convert the digital data signal to a format compatible with the source CPU 24 or the communications circuit 12, or to compress the digital data signal, the output from the analog to digital converter 20 is transmitted to the first DSP 22. Either the newly formatted digital data signal, the compressed data signal or the data signal from the analog to digital converter 20 is then transmitted to a combiner 68, such as a CPU, which combines the digital data signal with a set of instructions and a destination list obtained from an instructions and destination list source 70 to form a first data package.

The first data package is input into a first determiner 72 that determines a first error code from the first data package, using the Check-Sum error detection calculation or any other suitable error checking method. The first data package and the first error code are then transmitted to a first modem 74, that acts as a first transmitter, and then transmitted to the distribution center 14 via the communications circuit 12.

At the distribution center 14, the first data package and the first error code are received by a first receptor 76, such as the second DSU 38, described above, or a second modem. The first data package and/or the first error code can then be transmitted to and stored in the second digital storage device 50. If the transferred information is so stored, then it can be retrieved later by a first retriever 78 that is connected between the second digital storage device 50 and a decoder 80 and between the second digital storage device 50 and a second determiner 82.

Initially, the first data package and the first error code are input into the second determiner 82. Similar to the first determiner 72, the second determiner 82 calculates a second error code from the transferred first data package, using the Check-Sum error detection calculation or any other suitable error checking method. The first error code and the second error code are then transmitted to a first error detector 84 where they are compared to determine differences in the first data package after transmission to the first receptor 76.

Provided the first error code and the second error code match, and thereby indicate an error-free transmission, the first data package is input into the decoder 80 by either the first receptor 76 or the first retriever 78. The decoder 80 then selects the destination list from the first data package and reads the destination list. Next, it removes the destination list from the first data package to form a second data package.

The second data package is also transmitted to the second determiner 82, from the decoder 80, so that an alpha error code can be calculated from the second data package. Once the alpha error code is calculated, it and the second data package are transmitted to a remote destination 16 through a second transmitter, namely a second modem 86. The second transmitted information also transmitted via the communications circuit 12.

At the remote destination 16, the second data package and the alpha error code are received by a second receptor 88, such as the third DSU 52, described above, or a third modem. Similar to the capabilities of the hardware located at the distribution center 14, the second data package and/or the alpha error code can also then be transmitted to and stored in the third digital storage device 60. If the second transferred information is so stored, then it can be retrieved later by a second retriever 90 that is connected between the third digital storage device 60 and a separator 92 and between the third digital storage device 60 and a third determiner 94.

Next, the second data package and the alpha error code are input into the third determiner 94, which calculates a beta error code from the transferred second data package. The alpha error code and the beta error code are then transmitted to a second error detector 96 where they are compared to determine differences in the second data package after transmission to the second receptor 88.

When an error-free transmission of the second data package has occurred, it is input into the separator 92 by either the second receptor 88 or the second retriever 90. The separator 92 then separates the digital data signal from the set of instructions in the second data package. From there, if it is necessary to reformat the digital data signal prior to its use, or expand a compressed digital data signal, then the digital data package is processed by the second DSP 64. In this manner, if the DSP 22 has compressed the size of the information transmitted to the first CPU 24, the second DSP may utilize a digital expansion algorithm to expand the data signal. Finally, if required, the digital data signal can then be transmitted to the digital to analog converter 62 to generate an analog data signal.

Although the present invention has been described in detail with reference to the presently preferred embodiment, it will be appreciated by those of ordinary skill in the art that various modifications can be made without departing from the invention. Accordingly, the invention is limited only by the following claims.

I claim:

1. An electronic communications system for transmitting data signals over a communications circuit connectable to a predetermined set of remote destinations, comprising:

a combiner for combining a digital data signal with a set of instructions for use of the digital data signal and with a destination list including at least one remote destination selected from the predetermined set to form a first data package; a first determiner for determining a first error code from the first data package;

a first transmitter for transmitting the first data package and the first error code over the communications circuit to a distribution center;

a first receptor at the distribution center for receiving the first data package and the first error code from the first transmitter;

a decoder for selecting the destination list from the first data package, reading the destination list and removing the destination list from the first data package to form a second data package; a second determiner for determining a second error code from the first data package and an error detector for comparing the first error code with the second error code whereby to determine differences in the first data package after transmission to the first receptor;

a second transmitter for transmitting the second data package over the communications circuit to only the at least one remote destination included on the destination list;

a second receptor at the at least one remote destination for receiving the second data package from the second transmitter; and a separator for separating the digital data signal from the set of instructions in the second data package.

2. The electronic communications system of claim 1, wherein said second determiner further determines an alpha error code from the second data package, the alpha error code being transmitted by the second transmitter to the remote destination; and the system further includes:

a third determiner for determining a beta error code from the second data package, and an error detector for comparing the alpha error code with the beta error code whereby to determine differences in the second data package after transmission to the second receptor.

* * * * *

UNITED STATES PATENT AND TRADEMARK OFFICE
CERTIFICATE OF CORRECTION

PATENT NO. : 5,390,172

DATED : February 14, 1995

INVENTOR(S) : Gilbert Kuang

It is certified that error appears in the above-identified patent and that said Letters Patent is hereby corrected as shown below:

Col. 8, line 13, the word "a" should start a new paragraph.
Col. 8, line 26, the word "a" should start a new paragraph.

Signed and Sealed this

Sixth Day of June, 1995

Attest:

BRUCE LEHMAN

*Attesting Officer*     *Commissioner of Patents and Trademarks*